United States Patent [19]

Hirose et al.

[11] Patent Number: 5,165,502

[45] Date of Patent: Nov. 24, 1992

[54] ONE-MAIN PIPE TYPE CENTRALIZED LUBRICATION APPARATUS

[75] Inventors: Yuichi Hirose; Akinori Kuruma; Hidenari Tada, all of Settsu, Japan

[73] Assignee: Daikin Industries Ltd., Osaka, Japan

[21] Appl. No.: 743,757

[22] Filed: Aug. 12, 1991

[30] Foreign Application Priority Data

Aug. 28, 1990 [JP] Japan .................. 2-227342
Aug. 28, 1990 [JP] Japan .................. 2-227343
Jul. 12, 1991 [JP] Japan .................. 3-172589

[51] Int. Cl.⁵ .............................. F16N 27/00
[52] U.S. Cl. ............................ 184/7.4; 184/27.1; 184/32; 417/28
[58] Field of Search ........... 184/7.4, 32, 34, 27.4, 184/27.1, 27.2, 37, 6.4; 417/28, 44, 540; 137/625.17

[56] References Cited

U.S. PATENT DOCUMENTS

| | | | |
|---|---|---|---|
| 1,950,158 | 3/1934 | Barks | 184/7.4 |
| 2,766,848 | 10/1956 | Bystricky et al. | 184/27.1 |
| 3,145,803 | 8/1964 | Cobert | 184/7.4 |
| 3,317,002 | 5/1967 | McKenzie | 184/7.4 |
| 4,143,995 | 3/1979 | Divisi | 184/27.2 |
| 4,463,559 | 8/1984 | Holdenried | 137/625.17 |

FOREIGN PATENT DOCUMENTS 2348432 11/1977 France.
2403511 4/1979 France.

Primary Examiner—Ira S. Lazarus
Assistant Examiner—Alan B. Cariaso
Attorney, Agent, or Firm—Stevens, Davis, Miller & Mosher

[57] ABSTRACT

A one-main pipe type centralized lubrication apparatus having a pump device, one main oil feed pipe and a plurality of distributors, wherein the pump device is provided with a depressurization passage for opening a discharge passage connected to the main pipe into a tank and a depressurization valve. The direction of rotation of a motor for driving a pump element of the pump device is reversible so that the depressurization valve is operated in association with the motor and, when the motor normally rotates, the depressurization valve is controlled to be closed and, when the motor rotates in reverse, the depressurization valve is controlled to be open, thereby enabling forcible depressurization.

15 Claims, 9 Drawing Sheets

ONE-MAIN PIPE TYPE CENTRALIZED LUBRICATION APPARATUS

FIELD OF THE INVENTION

The present invention relates to a one-main-pipe type centralized lubrication apparatus which connects a plurality of distributors to one main oil feed pipe so that lubricating oil measured by each distributors is adapted to be supplied mainly to lubricating parts of a construction machine, such as a truck crane or power shovel.

BACKGROUND OF THE INVENTION

Conventionally, this kind of one-main-pipe type centralized lubrication apparatus, as disclosed in, for example, the Japanese Utility Model Publication Gazette No. Sho 52-150 and shown in FIG. 17, comprises; an electric-operated pump device provided with a pump element A communicating with a tank T in which lubricating oil is charged and a pilot operated directional control valve B; one main oil feed pipe F connected to a discharge port P of the electric-operated pump device, and a plurality of distributors G connected to the main oil feed pipe F, the directional control valve B being movably disposing therein, a spool C having first and second lands a and b, and being provided at one axial side of the spool C with a spring D, and at the other axial side with a pilot chamber E, a discharge passage H which communicates with the discharge side of the pump element A and with a discharge port P through the one main pipe, and a pilot passage I for communicating the pilot chamber E with the discharge passage H and a depressurized passage J for allowing the pilot chamber E to be open at the tank T through the spool C.

Each distributor G is provided; with two first and second chambers L and M partitioned by a valve body K, the first chamber L communicating with the main pipe F; and with a measuring cylinder N having a measuring piston n selectively communicating with the respective chambers L and M following the movement of the valve K, the first chamber L communicating with the main pipe F is pressurized to move the valve K so as to discharge lubricating oil in the second chamber M toward the lubrication parts, lubricating oil supplied from the main pipe F is introduced into the cylinder N and measured thereby, and thereafter the main pipe F side is depressurized so that the valve K is restored by operation of a spring S and the lubricating oil measured by the cylinder N is supplied to the second chamber M by operation of measuring piston, thereby preparing the next oil feed.

In the above-mentioned construction, when the pump element A stops, the spool C is held at the position in FIG. 17 by being biased by the spring D, a first land a of spool C closes the discharge passage H, the second land b shuts off communication of the pilot chamber E with the depressurized passage J, and the main pipe F is open to the tank T through the passage J so as to be depressurized. The pump element A starts to be driven from the above-mentioned stop condition, whereby the lubricating oil discharged from the pump element A is supplied from the discharge passage H to the pilot chamber E through the pilot passage I because the discharge passage H is closed by the first land a. Hence, pressure in the pilot chamber E rises so that the entire spool C moves against the spring D, the second land b closes the depressurized passage J and the discharge passage H is open, and the lubricating oil is supplied to each distributor G and then to lubricating parts therethrough as the above operation. Furthermore, after the lubricating oil is supplied to each distributor G so that oil feed to the lubricating parts is completed, the pump element A is stopped, whereby the spool C is restored by the spring D. Hence, the main pipe F is open at the depressurized passage J and depressurized thereat, the valve K of each distributor G is restored by operation of the spring S, and the measured lubricating oil is supplied to the second chamber M, thereby being prepared for the next oil feed.

In the one-main-pipe type centralized lubrication appratus constructed as above-mentioned, since the lubricating oil is supplied to each distributor G and measured therein, pressurization and depressurization at the main pipe G side must be repeated, and in a case where the pilot operated directional control valve B switched by starting or stopping the pump element A as the aforesaid electric-operated pump device, it is not problematical when lubricating oil or grease of low viscosity is used as the lubricant, but when a lubricating oil of high viscosity is used or the apparatus is used in low temperature condition, even if the pump element A stops, pressure drop at the pilot chamber E of pilot operated directional control valve B is carried out by a leak of oil from the pilot chamber A, so that a time delay is created so as not to carry out quick depressurization, thereby creating the problem in that an oil feed cycle from each distributor G is hindered.

On the other hand, the distributors are each provided with a measuring cylinder N disposed perpendicularly to the moving direction of the valve K, and improved distributors are proposed which dispose the valve and measuring piston in series so as to enable the valve body to be compact. Such distributor is disclosed in, for example, the U.S. Pat. No. 3,145,803 and shown in FIG. 18, wherein a cylinder bore U communicating with an oil feed passage Q and an oil discharge passage R is formed in a valve body O having the oil feed passage Q and oil discharge passage R, a measuring piston V is reciprocably provided in the cylinder bore U, the cylinder bore U is partitioned into a measuring chamber e and a back chamber f by the piston V, a valve W is disposed at the oil feed passage Q side of cylinder bore U, a spring X is interposed between the valve W and the piston V, and in the valve body O is formed an oil passage Y extending from the oil feed passage Q to the back chamber f.

The oil feed passage Q at each distributor constructed as the above-mentioned is connected to the main pipe communicating with a pump and lubricating oil is supplied to the oil feed passage Q by driving the pump, whereby the valve W at each distributor is forwardly moved to supply to the back chamber f at the cylinder bore U the lubricating oil supplied to the oil feed passage Q and the piston V is forwardly moved following the supply of lubricating oil, thereby feeding lubricating oil of a predetermined amount measured at the measuring chamber e from the oil discharge passage R to lubricating parts, such as a machine tool. After oil feed by each distributor is completed, the pump stops its drive to depressurize the main pipe connected with the oil feed passage Q. Hence, the valve body W is backwardly moved to cut off the communication of oil feed passage Q with the oil passage Y, and simultaneously therewith the piston V is backwardly moved by the spring X, so that the lubricating oil supplied to the back chamber f side is introduced into the measuring chamber e and measured therein for the next oil feed.

In the distributor constructed as above-mentioned, the oil passage Y for communicating the oil feed passage Q with the back chamber f at the piston V forms a vertical passage at the lateral side of cylinder bore U at the valve body O and a horizontal passage for communicating the vertical passage with the oil feed passage Q and back chamber f, so that the passage machining is very complicated. Also, the vertical and horizontal passages constituting the oil passage Y must perforate the outer surface of valve body O, whereby after the passage machining, a plug (not shown) must be mounted for closing each perforating portion. Hence, when the valve body W, piston V and spring X are assembled with the valve body O, whereby a problem is created in that the assembly efficiency is poor to thus complicating automatic assembly; thus the apparatus is expensive to produce as a whole.

SUMMARY OF THE INVENTION

A main object of the present invention is to provide a one-main-pipe type centralized lubrication apparatus which, even when lubricating oil of high viscosity is used or the apparatus is used in low temperature conditions, can ensure pressurization and depressurization with respect to a main oil feed pipe and reliably feed oil from distributors. It is an objective of this invention to provide a distributor for a one-main-pipe type centralized lubrication apparatus in which it is easy to machine oil passages, easy to automatically assemble, and inexpensive to produce as a whole.

A first characteristic of the present invention is that at a one-main-pipe type centralized lubrication apparatus comprises; a pump device having a motor, a pump element operable in association with the motor, a tank communicating with the suction side of the pump element, and an oil discharge passage communicating with the discharge side of the pump element; one main oil feed pipe connected to the discharge side of the pump device; one oil feed pipe connected to the main oil feed pipe; and a plurality of distributors connected to the main oil feed pipe; the pump device being constructed as follows:

The pump device is provided with a depressurization passage for opening the discharge passage at the tank and a de pressurization valve for opening or closing the depressurization passage with respect to the tank, the motor being normally and reversely rotatable, and between the motor and the depressurization there is provided an interlocking mechanism which, when the motor normally rotates, controls the depressurization valve to be closed and, when the same reversely rotates, controls the depressurization valve to be open.

In the above-mentioned construction, the pump element operates following the normal rotation of the motor so that the lubricating oil in the tank is supplied from the discharge passage at the pump body to the distributors and after the lubricating oil of predetermined amount is supplied to the distributors and oil feed therefrom is completed, the motor is reversely rotated so that the depressurization valve operates to forcibly open toward the tank the depressurization passage housing therein the depressurization valve, whereby the discharge passage, that is, the main pipe is immediately depressurized. As above-mentioned, since the reverse rotation of motor operates the depressurization valve to thereby enable forcible depressurization, even when the lubricating oil of high viscosity is used or the apparatus is used or the apparatus is used in low temperature conditions, an exact oil feed from each distributor is ensured.

In the above-mentioned construction, it is preferable that the interlocking mechanism is provided with an interlocking member moving in reciprocation between a first position of closing the depressurization valve and a second position for opening the same in association with the normal and reverse rotations of motor and between the interlocking member and the depressurization valve there is provided an elastic member which, when the interlocking member is put in the first position, biases the depressurization valve in the closing direction and, when pressure of the discharge passage exceeds a predetermined pressure, biases the depressurization valve to be open.

In such case, the valve body is retracted by the reverse rotation of motor to open the depressurization passage so as to immediately perform depressurization. When a failure occurs in the distributor and the discharge passage is at abnormally high pressure, the valve body operates to open the discharge passage, so that the depressurization valve serves also as a safety valve, thereby being superior in safety.

The pump device comprises a first communicating passage for communicating the pressurization passage with the discharge passage, a second communicating passage for communicating with the tank, and a valve chamber in which the respective communicating passages are open, the depressurization valve comprises a spool for communicating with or shutting off each communicating passage, so that the spool may be reciprocably housed in the valve chamber, and provided with a position control member position-controlled to the first position where the respective communicating passages are cut off and the second position where the same are communicated in association with the normal and reverse rotations of motor.

In this case, since the spool operates following the normal and reverse rotation of the motor so as to forcibly switch the discharge passage to the tank for depressurization, the depressurization can further be ensured.

Furthermore, in the pump device it is preferable that a discharge pressure detection passage communicating with the discharge passage, an indicator housed in the detection passage to operate in response to a rise in discharge pressure, a sensor for detecting operation of the indicator, and for giving a reverse rotation command to the motor on a basis of the detection result of the sensor. This structure enables the wiring arrangement to be shorten for giving a command so that the motor may be reversed with accuracy, as compared with a structure in which a rise in the discharge pressure the time of completion of the oil feed is detected at the distributor side to give the command for the motor to be reversed.

Also, a motor control circuit for reversely rotating the motor by turning on a depressurization detection sensor for detecting the depressurization pressure and for stopping the motor by turning off the same, is provided to facilitate the normal and reverse rotation control of the motor.

A second characteristic of the present invention is construction of the distributors at the one-main-pipe type centralized lubrication apparatus.

In detail, the distributors are each provided with a valve body having a cylinder bore in which the oil feed passage and oil discharge passage connected to the main oil feed pipe are open, a measuring piston movably housed in the cylinder bore so as to partition the cylinder bore into a measuring chamber and a back chamber, a valve for switching the back chamber of measuring piston to one of the oil feed passage and measuring chamber, and a spring interposed between the valve and the measuring piston so as to bias the valve and measuring piston in the direction of moving away from each other, and further has the following construction:

a) an open groove formed lengthwise of the cylinder bore at the valve body and open in the cylinder bore, b) a sleeve which is fitted into the cylinder bore so as to form an oil passage to close the open groove and communicate the oil feed passage with the back chamber.

c) a passage block fitted into the opening side of the cylinder bore and having a communicating bore communicating with the oil passage and an insersion bore for fitting therein the valve which communicates or cuts off the communicating bore with respect to the oil feed passage, and d) fixing means for fixing the sleeve and passage block into the cylinder bore.

Accordingly, in the above-mentioned construction, the sleeve is fitted into the cylinder bore so that the oil passage can be formed of the sleeve and open groove, the open groove being merely formed lengthwise of the cylinder bore, whereby the oil passage can simply be formed without the conventional passage machining. Moreover, into the cylinder bore at the valve body is fitted the passage block having the communicating bore so that the oil passage is communicated with the oil feed passage through the communicating bore, in other words, the communicating bore need only be formed at the passage block and the horizontal passage as in the conventional example need not be formed at the valve body, thereby facilitating machining of the passage.

Also, in the above-mentioned construction, at one lengthwise end of the cylinder bore is provided the bottom surface around the opening at which the oil feed passage is open, and the other lengthwise end is open, so that fixing means for fixedly pressing to the bottom surface the passage block and sleeve fitted into the valve body from the opening side of cylinder bore is used, which is one characteristic of the invention.

Thus, the passage block, sleeve, valve, spring and measuring piston can be assembled from the opening side of cylinder bore and the passage block and sleeve fitted into the cylinder bore from the opening side thereof are pressed onto the bottom surface, thereby being fixed into the cylinder bore. Hence, the respective parts can simply be assembled and automatic assembly also is easy.

It is preferable that the cylinder bore and sleeve fitted therein are tapered at the oil feed passage sides thereof toward the oil feed passage. Thus, sealing efficiency between the oil discharge passage and the oil passage is good so as to prevent lubricating oil from leaking from the oil passage to the oil discharge passage.

It is also preferable to provide at the sleeve an oil discharge bore coincident with the oil discharge passage at the valve main body and a positioning projection for the oil discharge bore and engageable with the open groove. Thus, the oil discharge bore at the sleeve and the oil discharge passage are reliably positioned to further facilitate the automatic assemble of the apparatus.

Furthermore, it is preferable that the passage block comprises a passage member having the communicating bore and an end member facing the measuring chamber, the passage member and end member having insertion bores into which the valve body is movably fitted, the end member being provided with a first packing facing the insertion bore and contacting with the surface of passage member, and the valve body being provided with a second packing facing the oil feed passage and contacting with the rear surface of passage member.

Therefore, there is no trouble that the packing disposed at the insertion bore side of valve body at the end member side and the oil feed passage side of passage member, especially the packing disposed at the insertion bore side, is previously assembled in the insertion bore, and when the respective members are assembled in the cylinder bore, the respective packings can sequentially be assembled to further facilitate the automatic assembly.

Alternatively, the end member may be integral with the sleeve.

The sleeve may be straight cylindrical and be formed of a single member and alternatively formed of two members of a first sleeve to hold the passage block and a second sleeve having a regulating portion to regulate movement of the measuring piston so that the sleeves may be inserted into the cylinder bore in an abutting manner.

In this case, it is preferable that at the first sleeve is provided an open groove extending lengthwise of the cylinder bore and open therein so that an oil passage for communicating the oil feed passage with the rear chamber of the measuring piston is formed when the first sleeve together with the second sleeve is inserted into the cylinder bore.

Therefore, the passage is furthermore simple to form and the main valve body need only be provided with the cylinder bore, oil feed passage and oil discharge passage, thereby enabling its workability to be improved and the first and second sleeves are molded of synthetic resin, thereby further improving the workability.

Other and further objects, features and advantages of the invention will become apparent doring the following discussion of the accompanying drawings.

DETAILED DESCRIPTION OF THE INVENTION

Figure 1:
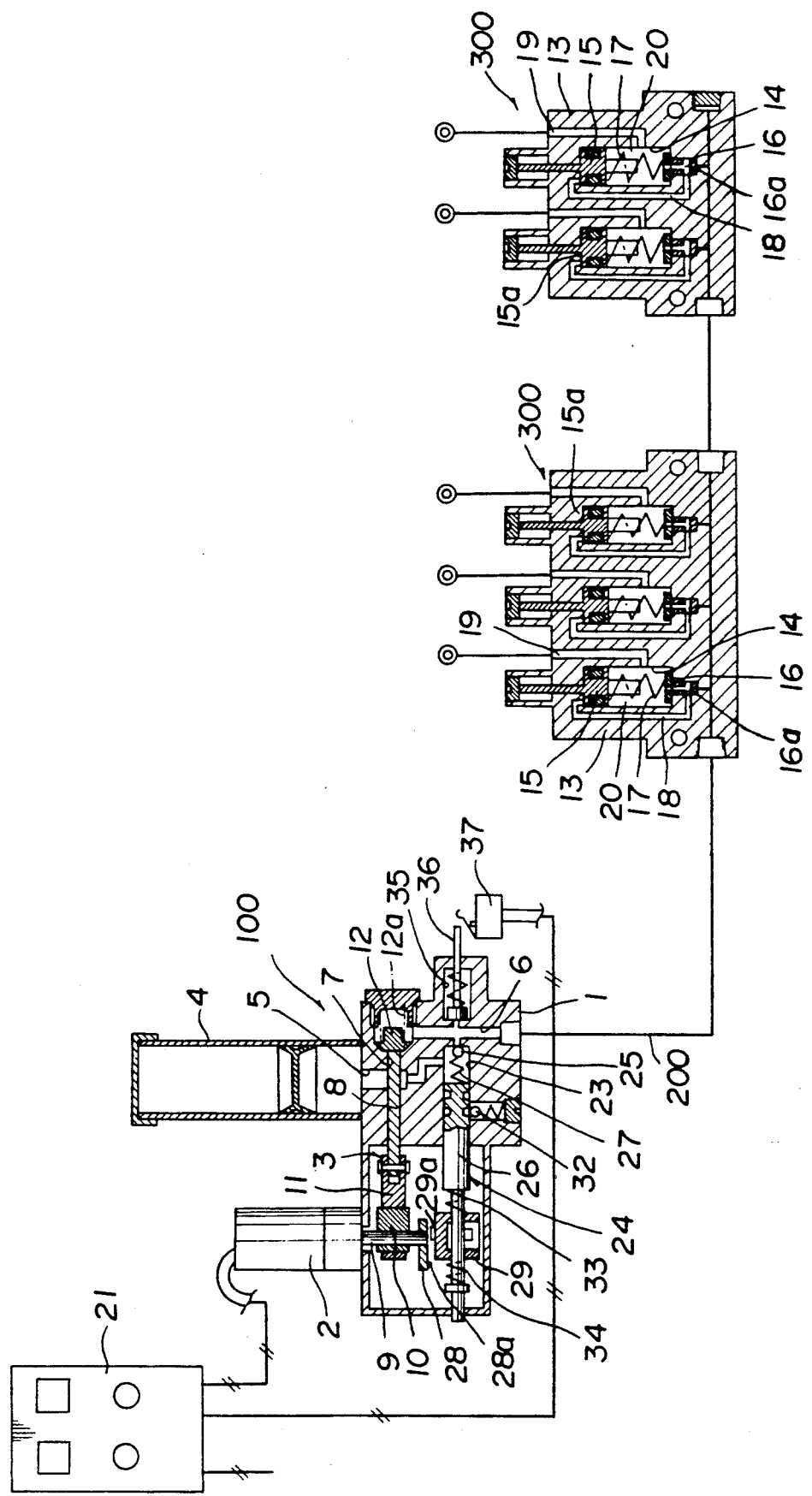
FIG. 1 is a schematic sectional view of an embodiment of a one-main-pipe centralized lublication apparatus of the present invention.

A one-main-pipe type centralized lubrication apparatus shown in FIG. 1 comprises an electric-operated pump device 100 and a plurality of distributors 300 connected to the electric-operated pump device 100 through one main oil feed pipe 200.

The electric-operated pump device 100 disposes in a pump body 1 a pump element 3 operable in association with a motor 2, forms at the suction side of the pump element 3 of the pump body 1 a suction passage 5 communicating with a tank 4 charged with lubricating oil, and is provided at the discharge side of pump element 3 of the pump body 1 with a discharge passage 6 connected with the main pipe 200. The pump element 3 is provided with a cylinder chamber 7 communicating with the suction passage 5 and a piston 8 reciprocably provided in the cylinder chamber 7, the piston 8 being connected to the foremost end of a crank 11 fitted into an eccentric cam 10 fixed to a rotary shaft 9 of the motor 2, and the piston 8 is moved in reciprocation in the cylinder chamber 7 through the crank 11 following the rotation of motor 2, whereby the lubricating oil taken-in into the cylinder chamber 7 from the tank 4 into the cylinder chamber 7 through a suction passage 5 is forced to be supplied to the discharge passage 6 and a discharge valve 12 interposed therein is open against a spring 12a, thereby supplying the lubricating oil from the discharge passage 6 to the main pipe 200 through the open discharge valve 12.

Each distributor 300 is so constructed that in a valve body 13 are formed a plurality of cylinder bores 14 communicating with the main pipe 200, a measuring piston 15 is reciprocably provided in each cylinder bore 14, a valve 16 is provided at the communication side of cylinder bore 14 with the main pipe 200, a spring 17 is interposed between the valve 16 and the piston 15, in the valve body 13 is formed an oil passage 18 for the lubricating oil, extending the from the connection side of cylinder bore 14 with the main pipe 200 near the valve 16 toward a rear chamber 15a of the measuring piston 15 in the cylinder bore 14, and at the valve body 13 is formed a discharge passage 19 extending from an intermediate portion in the reciprocation direction of the piston 15 toward the outside of valve body 13. In addition, each valve 16 has a communicating passage 16a which, during the depressurization to be discussed below, communicates the oil passage 18 with a measuring chamber 20 provided between the measuring piston 15 and the valve 16.

In the above-mentioned construction, when the motor 2 is rotated in its normal direction, the pump element 3 is driven following the rotation of motor 2 so that the lubricating oil is supplied to the main pipe 200, and the valve 16 rises by oil feed to the main pipe 200 so that the lubricating oil therein is introduced from the oil passage 18 to the back chamber 15a of the measuring piston 15, whereby the piston 15 forwardly moves (lowers) and the lubricating oil of a predetermined amount measured by the measuring chamber 20 is fed from the discharge passage 19 to lubrication parts at a construction machine mainly of a crane truck or a power shovel. After each distributor 300 completes oil feed, the valve 16 moves backwardly (lowers) by depressurization to be discussed below, and the piston 15 moves backwardly (rises) by being biased by the spring 17, so that the lubricating oil introduced into the back chamber 15a of piston 15 is introduced into the measuring chamber 20 at the cylinder bore 14 through the oil passage 18 and communicating passage 16a provided at the valve 16, thereby preparing for the next oil feed. In addition, in FIG. 1, reference numeral 21 designates a control box housing therein a control circuit 22 for the motor 2 to be discussed below.

In the one-main-pipe type centralized lubrication apparatus shown in FIG. 1, the electric-operated pump 100 is so constructed that within the pump body 1 is formed a depressurization passage 23 for opening the discharge passage 6 at the tank 4 side through the suction passage 5, a pressurization valve 24 is interposed in the pressurization passage 23, a normally and reversely rotatable motor is used as the motor 2, and the depressurization valve is open in association with the reverse rotation of motor 2, so that the depressurization valve 24 is open to carry out depressurization of the main pipe 200 communicating with each distributor 300.

The depressurization valve 24 shown in FIGS. 1 through 4 comprises a spherical valve 25 disposed at the opening side of the depressurization passage 23 toward the discharge passage 6, an interlocking member 26 reciprocable in association with the normal and reverse rotations of motor 2, and an elastic member 27 interposed between the valve 25 and the interlocking member 26, the interlocking member 26 retracting to open the valve 25 which is always biased in the closing direction by the elastic member 27, thereby performing depressurization. Also, in the above-mentioned construction, when pressure at the discharge passage 6 becomes abnormally high by a failure in each distributor, the valve 25 is open by the high pressure against the elastic member 27 so that the high pressure at the discharge passage 6 can be released to the tank 4, thus the valve 25 is formed both as a safety valve. For operating the interlocking member 26 in association with the motor 2, an eccentric cam plate 28 which is integrally rotatably mounted to a rotary shaft 9 of motor 2 and having an operating pin 28a projecting from the outer periphery of the cam plate 28 and a sliding member 29 which is supported to the interlocking member 26 in relation of being movable within a predetermined range and has a projection projecting from the opposite surface to the pin 28a, are used, so that the operating pin 28a at the eccentric plate 28 is allowed to abut against the projection 29a at the sliding member 29 following the normal or reverse rotation of motor 2, whereby the sliding member 29 is moved in reciprocation to move the interlocking member 26 toward a first position where the valve 25 closes the opening of depressurization passage 23 toward the discharge passage 6 and a second position where the valve 25 is positioned inwardly of depressurization passage 23 apart from the opening so as to depressurize the distributors 300. At the outer periphery of interlocking member 26 are provided two engaging grooves 30 and 31 spaced from each other at a predetermined interval, and a detent mechanism is provided which comprises the engaging grooves 30 and 31 and an engaging member 32 elastically engageable with one of the engaging grooves 30 and 31 and composed mainly of a ball, so that the interlocking member 26 is capable of being held in the first or the second position. In addition, between both the end faces of sliding member 29 and the interlocking member 26 are provided first and second springs 33 and 34 for holding the sliding member 29 at a neutral position in the sliding direction, so that, when the motor 2 is normally rotatably driven, the sliding member 29 is moved against the first spring 33 so as to hold the interlocking member 26 in the first position by the detent mechanism. After the interlocking member 26 is held in the first position, the sliding member 29 moves in reciprocation, but returns to the neutral position by a spring force of the first spring 33. Next, the motor 2 is reversely rotated, the operating pin 28a abuts against the projection 29a of sliding member 29, the sliding member 29 moves against the second spring 34, the interlocking member 26 is held in the second position by the detent mechanism, and thereafter the sliding member 29, the same as during the normal rotation, can return to the neutral position.

An embodiment shown in FIGS. 1 through 4 is provided at the pump body 1 with a discharge pressure detection passage 35 communicating with the discharge passage 6, in the discharge pressure detection passage 35 is housed an indicator 36 movable when the discharge pressure at the discharge passage 6. rises, and on the moving path of the indicator 36 is disposed a sensor 37 comprising a limit switch, so that, when the discharge pressure at the discharge passage 6 rises, a reverse rotation command is given from the sensor 37 toward the motor 2.

Figure 2:
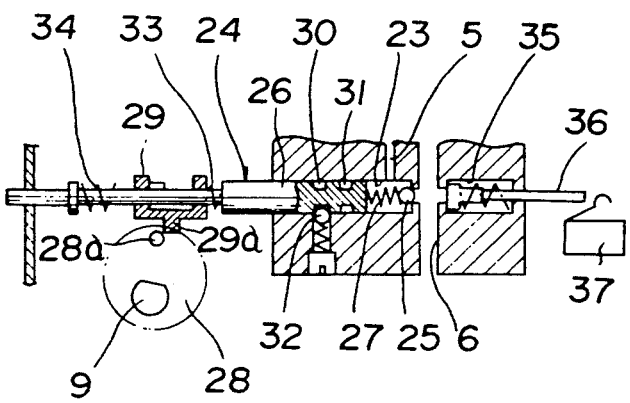
FIG. 2 is an illustration of an operating mechanism of a depressurization valve of an electric-operated pump device.
Figure 3:
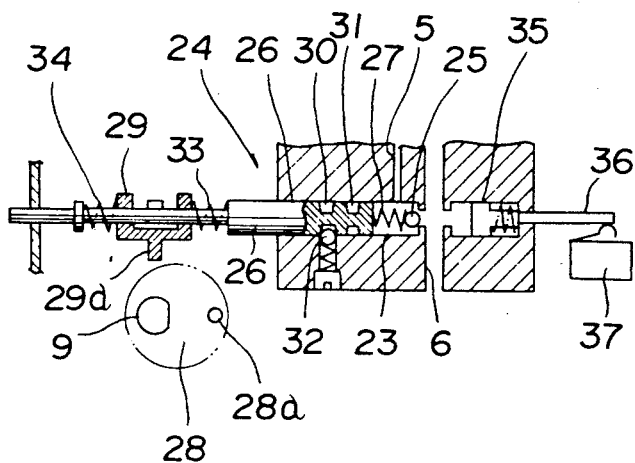
FIGS. 3 and 4 are illustrations of the operating state of the depressurization valve.
Figure 4:
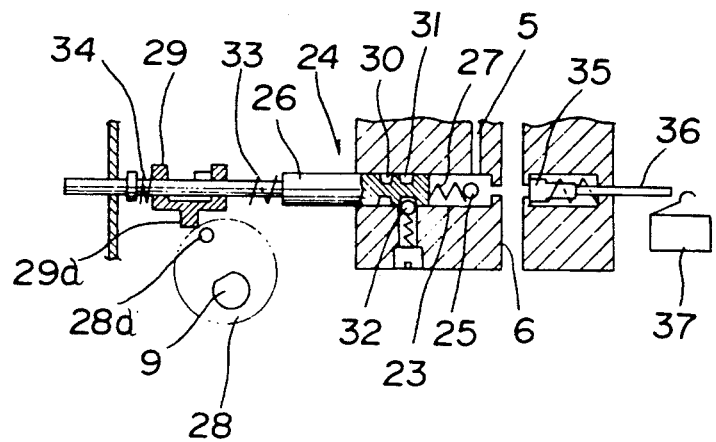

When the lubricating oil is intended to be supplied from the electric-operated pump 100 to the distributors 300, as shown in FIG. 2, the motor 2 is normally rotated, so that the interlocking member 26 of depressurization valve 24 moves in association with the motor 2 to put the valve 25 in the first position where the valve 25 closes the depressurization passage 23. In such the state, the pump element 3 is actuated following the normal rotation of motor 2 so as to supply the lubricating oil in the tank 4 from the discharge passage 6 at the pump body 1 to the distributors 300 through the main pipe 100. When the predetermined amount of lubricating oil is supplied to the distributors 300 to complete oil feed thereat and pressure in the main pipe 200 rises, as shown in FIG. 3, pressure at the detection passage 35 also rises, the indicator 36 disposed therein is moved, the sensor 37 provided on the moving path thereof operates, and the reverse rotation command is given to the motor 2. When the motor 2 reversely rotates by the command from the sensor 37 as shown in FIG. 4, the interlocking member 26 moves leftwardly through the process in FIG. 3 to put the valve 25 in the second position where the valve 25 opens the depressurization passage 23, so that the depressurization passage 23 communicating with the suction passage 5 is open to the discharge passage 6, thereby depressurizing the main pipe 200. Thus, the motor 2 is reversely rotated to actuate the depressurization valve 24 to thereby forcibly depressurizing the main pipe 200, so that, even when lubricating oil of high viscosity is used or the apparatus is used in low temperature conditions, depressurization can be quickly performed, thereby properly operating the distributors 300.

Figure 5:
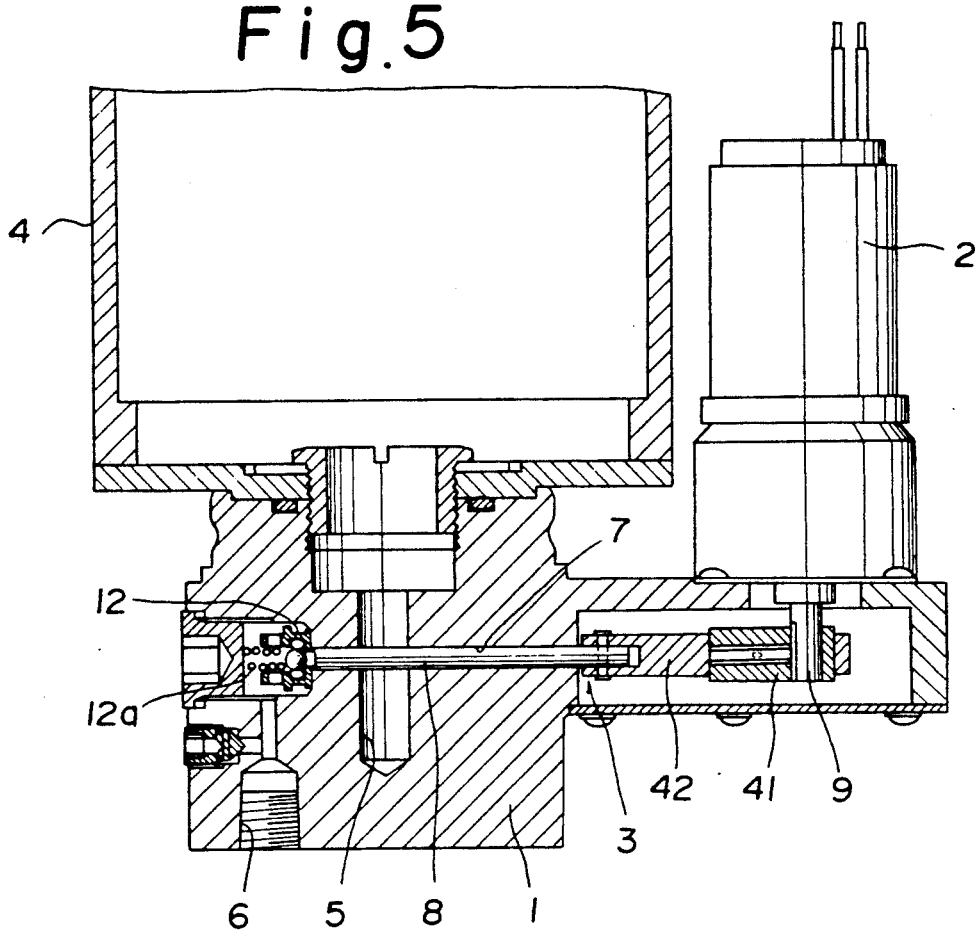
FIG. 5 is a sectional side view of a modified embodiment of the electric-operated pump device.
Figure 6:
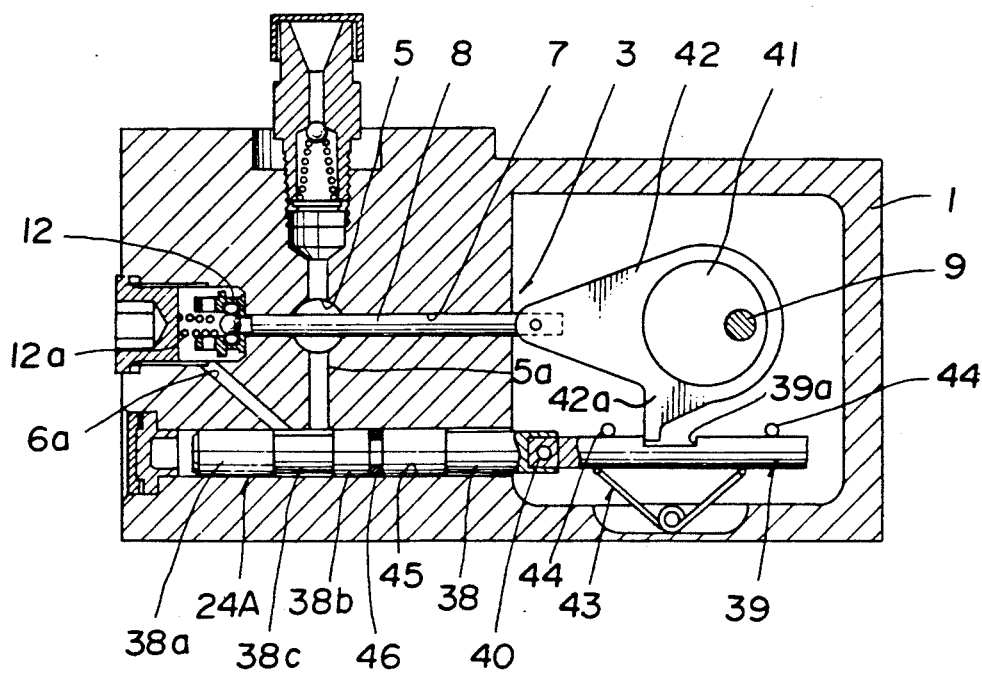
FIG. 6 is a sectional plane view thereof.

The depressurization valve 24, as shown in FIGS. 5 and 6, may use a directional valve of a spool type for selectively changing-over supply of lubricating oil to the distributors 300 and depressurization thereof. In other words, the depressurization valve 24A shown in FIG. 6 uses a spool 38 having two first and second lands 38a and 38b and provided therebetween with a smaller diameter portion 38c, the spool 38 is connected through a connecting pin 40 with a position control member 39 for the spool 38, which reciprocates in association with the rotary shaft 9 of motor 2, and the position control member 39 is moved in reciprocation by the normal and reverse rotations of motor 2, thereby changing over the spool 38. Consequently at a portion of the outer periphery of the position control member 39 is formed an engaging groove 39a extending lengthwise thereof, and a projection 42a engageable with the engaging groove 39a at the position control member 39 is integrally formed at a lateral portion of the crank 42 fitted onto an eccentric cam 41 fixed to the rotary shaft 9 of motor 2 and connected at the utmost end with the piston 8 of pump element 3. A spring 43 and two lift-prevention pins 44 are formed within the pump body 1 and at both opposite sides thereof, whereby the position control member 39 is supported by the spring 43 and pins 44.

The spool 38 is reciprocably housed in a valve chamber 45 provided at the pump body 1, and in the valve chamber 45 are open a first communicating passage 6a communicating with the discharge passage 6 and a second communicating passage 5a communicating with the tank 4 through the suction passage 5, the first and second communicating passage 6a and 5a and valve chamber 45 constituting a depressurization passage.

When the rotary shaft 9 is reversely rotated, the projection 42a engages with the engaging groove 39a to move the position control member 39 and the smaller diameter portion 38c positioned between the first and second lands 38a and 38b at the spool 38, as shown in FIG. 6, is put in the position where the first communicating passage 6a and second communicating passage 5a are open in the valve chamber 45 so that the spool 38 is controlled to be put in the second position where the communicating passage 6a and 5a communicate with each other, thereby performing the depressurization of main pipe 200. Also, when the rotary shaft 9 is normally rotated, the position control member 39 is moved in the reverse direction (rightwardly) to the position in FIG. 6 and the first land 38a of spool 38 closes the openings of the first and second communicating passages 6a and 5a so that the spool 38 is controlled to be in the first position where the communicating passages 6a and 5a cut off communication therebetween, thereby eliminating the depressurization. Thus, the lubricating oil supplied from the discharge passage 6 to the distributors 300 through the main pipe 200. In addition, in FIG. 6, an O-ring 46 is provided at the outer periphery of the second land 38b so that the spool 38 can be held at its moving position by the O-ring 46.

The motor 2 is preferable a normally and reversely rotatable DC motor. In this case, the normal and reverse rotation control for the motor 2 is carried out by a motor control circuit 22 using a depressurization sensor shown in FIG. 7.

In detail, the control circuit 22 in FIG. 7 interposes in a power supply line connected to a DC power source, such as a battery, a key switch KS which is on in association with turn-on of an operation switch at a main machine of an oil feed object, for example, a power shovel, and an instantaneous contact 62G-1 at a signal timer 62G to be discussed below; connects to the power supply line a system timer 2G which integrates an operation time of the main machine and outputs an oil feed command every predetermined time; between the power supply lines are connected in parallel an integration auxiliary relay 16GX which is energized by turn-on of the key switch KS to issue an integration instruction to the system timer 2G and a series circuit of a contact 33G of the limit switch 37 operating by the operation of indicator 36 and constituting the depressurization detection sensor and an on-delay relay DL excited after the turn-on of contact 33G, at a delay of, for example, 5 through 10 seconds. And, the following control circuits are connected in parallel.

(1) A motor control circuit which connects; a parallel circuit of a normally open contact DL-1 of the on-delay relay DL, an instantaneous contact 2G-1 of the system timer 2G, a push-button switch 3-88G and a normally open contact 33GX1-1 for a motor operating auxiliary relay 33GX1 to be discussed below; a series circuit of a normally close contact D4-2 of the on-delay relay DL and a parallel circuit of the operation auxiliary relays 33GX1 and 33GX2; and a series circuit of the motor 2 and parallel circuits 33GX1-2 and 33GX2-1 of normally open contacts and normally closed contacts of the operating auxiliary relays 33GX1 and 33GX2.

(2) An abnormality detection control circuit which connects in series; a signal timer 62G which, when the instantaneous contact 2G-1 is on by the oil feed command by the system timer 2G and the operation auxiliary relays 33GX-1 and 33GX-2 are excited to operate the motor 2, is excited to start counting together with oil feed start, so that, when the contact 33G of the limit switch 37 is not on even over a predetermined oil feed required time (for example 10 minutes) the timer 62G decides the abnormality in oil feed to inform abnormality; with a parallel circuit of a time limit contact 62G-2 for self-holding the timer 62G and a normally open contact 33GX1-3 of the operation auxiliary relay 33GX-1.

Figure 7:
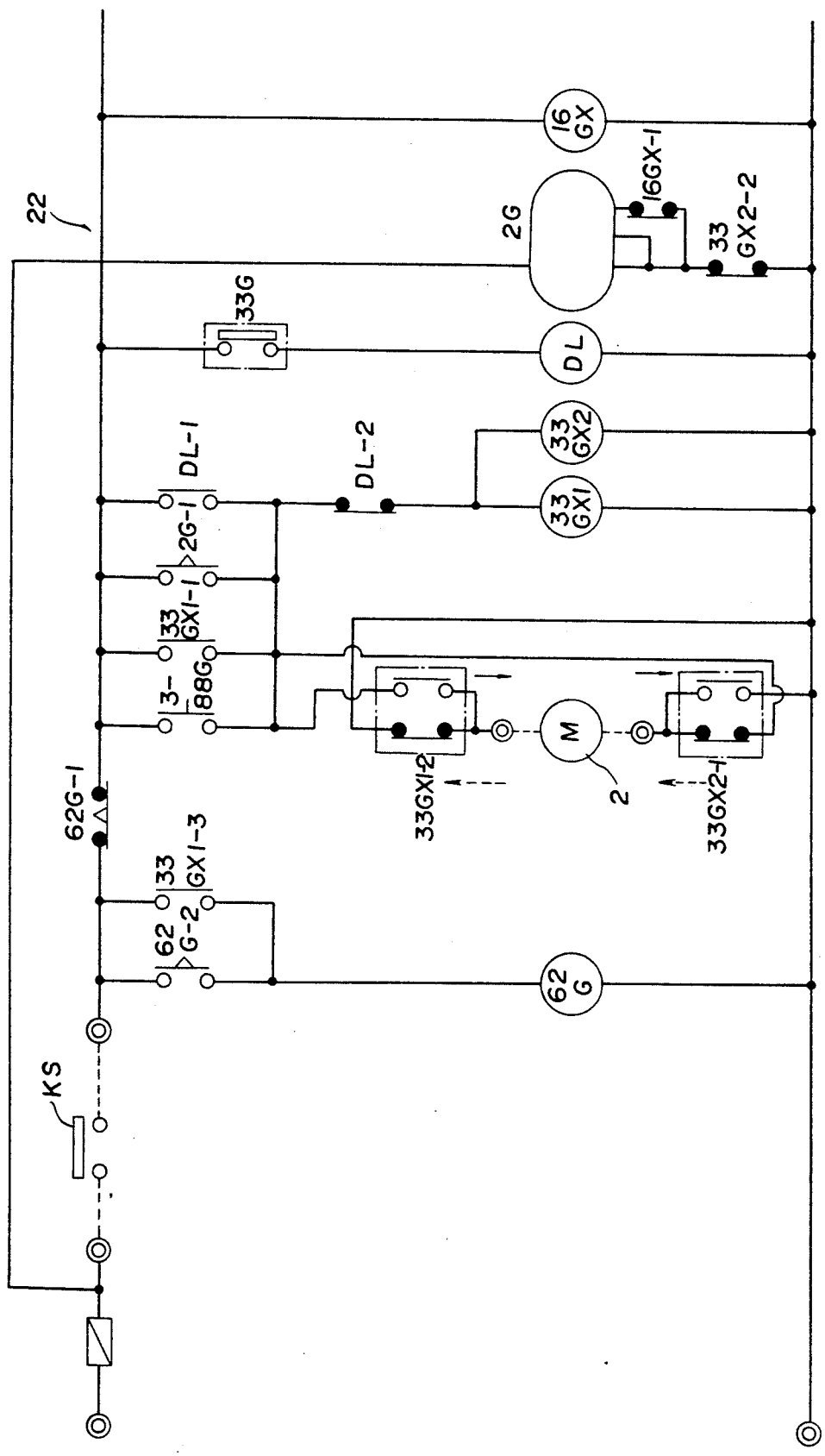
FIG. 7 is a control circuit diagram of a motor.

In addition, in FIG. 7, reference numeral 33GX2-2 designates a normally closed contact at the operation auxiliary relay 33GX2, and 16GX-1 designates a normally closed contact of the auxiliary relay 16GX.

The key switch KS is on so as to excite the auxiliary relay 16GX, the system timer 2G integrates the on-operation time of key switch KS, and the oil feed command is given every predetermined time. In other words, when the operation time of the main machine has lapsed for the predetermined time, the system timer 2G is on to close its contact 2G-1, whereby the operation auxiliary relays 33GX1 and 33GX2 are excited to switch the contacts 33GX1-2 and 33GX2-1 thereof, a current flows in the motor 2 as shown by the solid line arrow in FIG. 7, the motor 2 is normally rotated, and the lubricating oil is supplied to the distributors 300. In addition, upon on-operation of the instantaneous contact 2G-1 of system timer 2G, the auxiliary relay 33GX11 is excited to turn on its normally open contact 33GX1-1, then the self holding acts to continue the drive of motor 2. Hence, when oil feed to each distributor 300 is completed and a pressure rise at the discharge passage 6 is caused, the contact 33G of limit switch 37 is on and the delay relay DL is excited, so that the normally closed contact DL-2 thereof is open after a predetermined time (5 through 10 sec.), the auxiliary relays 33GX1 and 33GX2 are released of excitation to switch contacts 33GX1-2 and 33GX2-1 thereof, and a current flows in the motor 2 as shown by the dotted line arrow in FIG. 7 through the normally open contact DL-1 to be closed by excitation of the on-delay relay DL, thereby reversely rotating the motor 2. Thus, the main pipe 200 communicating with the distributors 300 is depressurized. The depressurization is further carried out, and, when the contact 33G of limit switch 37 is off, the on-delay relay DL is released of its excitation to stop energization of the motor 2. The signal timer 62G is operated following the excitation of auxiliary relay 33GX1, and when counting by the signal timer 62G for a predetermined time is completed, the off-operation of contact at the timer 62G stops the motor 2.

As the above-mentioned, the electric-operated pump 100 is provided within the pump body 1 with a depressurization passage 23 for opening the discharge passage 6 toward the tank 4, the motor 2 for driving the pump element 3 is made normally and reversely rotatable, depressurization valves 24 and 24A operable in association with the reverse rotation of motor 2, and the depressurization valves 24 and 24A are housed in the depressurization passage 23, whereby the motor 2 reversely rotates to actuate the depressurization valves 24 and 24A so as to force the discharge passage 6 communicating with the distributor, in turn the main pipe, to be depressurized. Accordingly, even when lubricating oil of high viscosity is used or the apparatus is used in low temperature conditions, the depressurization is quick and accurate operation at the distributors is carried out, thereby enabling exact oil feed to be carried out.

The depressurization valve 24, as shown in FIGS. 1 through 4, comprises the valve 25, the interlocking member 26 movable in reciprocation in association with the normal and reverse rotations of motor 2, and the elastic member 27 interposed between the valve 25 and the interlocking member 26 so as to bias the valve 25 in the closing direction and to open the valve 25 when pressure at the discharge passage 6 is abnormally high, whereby the depressurization is quickly carried out and, when a failure is caused in the distributor or the like, the depressurization valve 24 is usable also as a safety valve, thereby being superior in safety.

Also, as shown in FIGS. 5 and 6, the depressure valve 24A comprises the spool 38, to which the position control member 39 movable in reciprocation in association with the normal and reverse rotations of motor 2 is connected, whereby the change-over spool 38 changes-over the discharge passage 6 into the depressurization circuit 23 to enable further exact depressurization.

Furthermore, the pump body 1 is provided with the discharge pressure detection passage 35 communicating with the discharge passage 6, the indicator 36 housed in the detection passage 35 and operable in response to the rise of discharge pressure, and the sensor 37 for detecting operation of indicator 36 to give a reverse rotation command to the motor 2, so that simple wiring can give the accurate reverse rotation command in comparison with construction to detect the rise of discharge pressure when oil feed ends, and to give the same command to the motor 2. The motor 2 uses a normally and reversely rotatable DC motor and a motor control circuit 22 is provided which reverely rotates the motor 2 by on-operation of the depressurization detection sensor 37 for detecting the depressurization and to stop the rotation of motor 2 by off-operation of the same, whereby the motor 2 is easy to control its normal and reverse rotations and oil feed from the distributor is ensured.

Next, explanation will be given on a preferred embodiment of each distributor 300 connected to the electric-operated pump device 100 through the mainpipe 200 as the above-mentioned.

Figure 8:
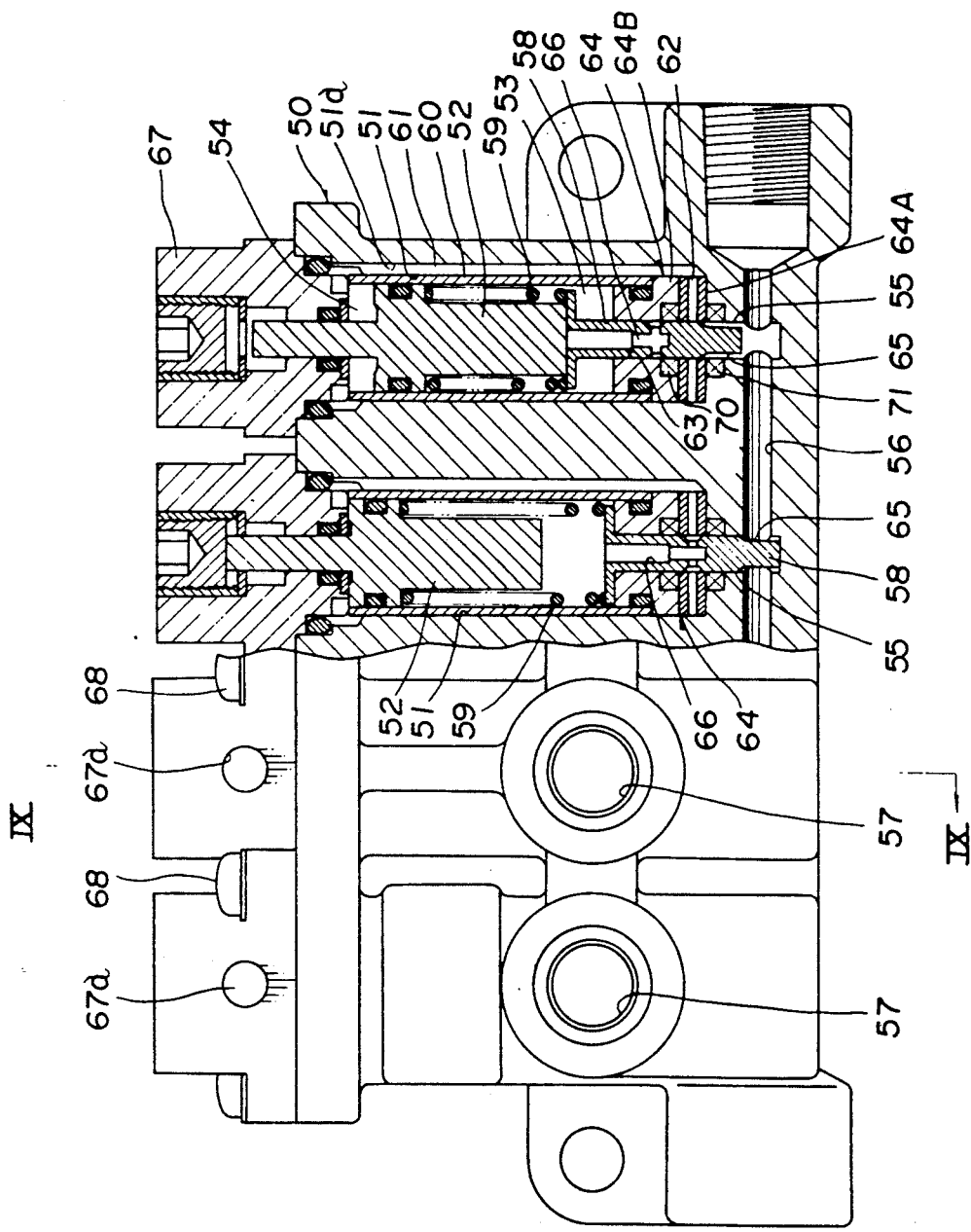
FIG. 8 is a partially cutaway front view of an embodiment of a distributor.

In FIG. 8, four distributors are juxtaposed, which improves that shown in FIG. 1. In detail, at a valve body 50 are formed four vertical cylinders bores 51 vertically extending, in each of which a measuring piston 52 is housed in relation of being movable in reciprocation, each cylinder bore 51 is partitioned therein into a measuring chamber 53 and a back chamber 54, and at the valve body 50 are formed one oil feed passage 56 communicating with each cylinder bore 51 through a branch 55 so as to supply lubricating oil to each cylinder bore 51, and a plurality of oil discharge passage 57 for discharging the lubricating oil from each cylinder bore 51. A valve 58 is disposed at the oil feed passage 56 side of each cylinder bore 51 and a spring 59 is interposed between each valve 58 and each piston 52.

Each cylinder bore 51 provided at the valve body 50 is open at the lengthwise upper side and blind at the lower side, at the valve 50 is provided an open groove 51a open to the cylinder bore 51 side and vertically extending along the cylinder bore 51, and a sleeve 60 is fitted into the cylinder bore 51, so that an oil passage 61 communicating with the back chamber 54 is formed between the sleeve 60 and the open groove 51a. Into the lower portion of cylinder bore 51 is fitted a passage block 64 having a communicating bore 62 communicating with the oil passage 61 and an insertion bore 63 for insertably supporting the valve 58 so as to be being vertically movable, and at the valve 58 are formed first and second passages 65 and 66 for selectively communicating the communicating bore 62 at the passage block 64 with one of the oil feed passage 61 and measuring room 53 at the cylinder bore 51. Furthermore, at the upper opening of each cylinder bore 51 at the valve body 50 is fixed a lid 67 with a fixing bolt 68, so that the lid 67 fixedly assembles the sleeve 60 and passage block 64 within the valve body 50.

When the distributors constructed as the above-mentioned are assembled, the passage block 64 at first is fitted into each cylinder bore 51 from the upper opening side thereof at the valve body 50, into the insertion bore 63 at the block 64 is inserted the leg of valve 58, next, into the cylinder bore 51 are fitted the sleeve 60 and then the spring 59 and measuring piston 52, and thereafter the lid 67 is fixed onto the upper opening of cylinder bore 51 by the fixing bolt '68a, whereby the passage block 64 is pressed onto the bottom surface of cylinder bore 51 through the sleeve 60. Thus, the sleeve 60 and passage block 64 are simply fixedly assembled in the cylinder bore 51, thereby enabling simple assembly. Also, since within the valve body 50 is formed an open groove 51a extending along the cylinder bore 51 and the sleeve 60 is fitted into the cylinder bore 51 so as to form the oil passage 61 communicating with the back chamber 54 at the cylinder bore 51, the oil passage 61 can simply be formed without the need of complicated machining of the passage.

The oil passage 56 is connected to the main pipe 200 communicating with the electric-operated pump 100 and when the electric-operated pump 100 is driven to supply lubricating oil to the oil feed passage 61, the valve 58 moves upwardly in the cylinder bore 51 so that the lubricating oil in the oil feed passage 56 is supplied from the oil passage 61 formed with the sleeve 60 and open groove 51a to the back chamber 54 of cylinder bore 51 through the first passage 65 provided at the valve 58 and the communicating bore 62 provided at the passage block 64, so that the measuring piston 52 forwardly moves against the spring 59 following the supply of lubricating oil and the lubricating oil of the predetermined amount measured in the measuring chamber 53 is lubricated to each lubricating portion, such as a power shovel, from the discharge passage 57. After the oil feed to each distributor ends, the electric-operated pump 100 is stopped to depressurize the main pipe 200 communicating with the oil feed passage 56, whereby the valve 58 restored to cut off communication of the oil feed passage 56 with the oil passage 61 and simultaneously the piston 52 is restored by the spring 59, so that the lubricating oil supplied to the back chamber 54 is introduced into the measuring chamber 53 from the oil passage 61 through the communication bore 62 at the passage block 64 and second passage 66 provided at the valve 58, thereby preparing the next oil feed.

Figure 10:
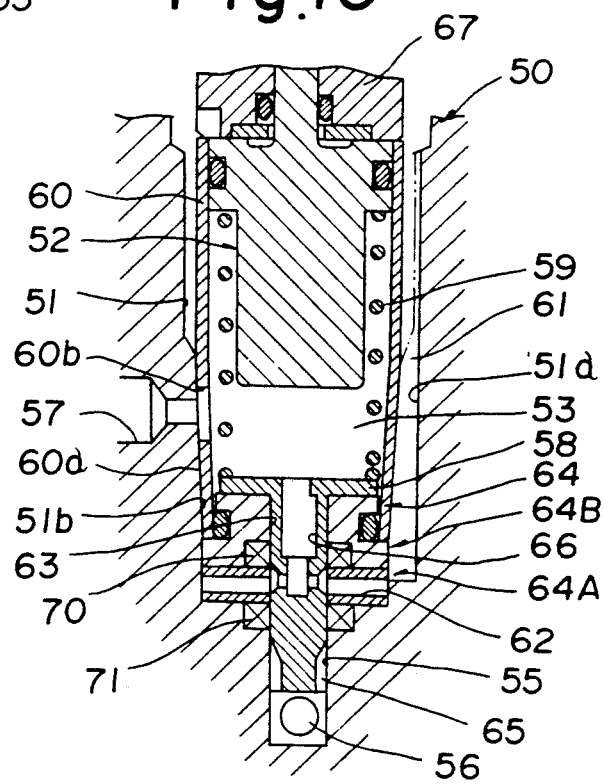
FIG. 10 is a longitudinally sectional view of a modified embodiment of the distributor, corresponding to FIG. 9.

In the above-mentioned construction, it is preferable that the cylinder bore 51 formed at the valve body 50, as shown in FIG. 10, has at the upper opening side a slightly larger diameter than an outer diameter of sleeve 60 inserted into the cylinder bore 51 and at the lower closing side a tapered portion 51b gradually tapered toward the oil feed passage 56, and at the lower portion of sleeve 60 is formed a tapered portion 60a coincident with the tapered portion 51b. Thus, insertion of sleeve 60 into the cylinder bore 51 becomes easy and the tapered portions 51b and 60a are fixedly fitted in relation of slidably contacting with each other, whereby the sealing efficiency between the sleeve 60 and the cylinder bore 51 is good, thereby reliably preventing the lubricating oil from leaking from the oil passage 61 to the oil discharge passage 57.

Figure 11:
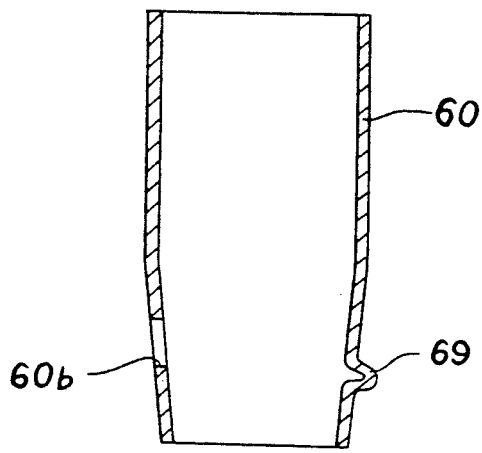
FIG. 11 is a longitudinally sectional view of a sleeve of the FIG. 10 embodiment.
Figure 12:
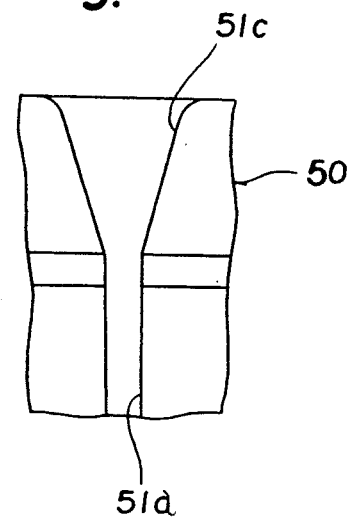
FIG. 12 is a partial illustration showing part of an open groove provided at a main valve body.

The sleeve 60, as shown in FIG. 11, is provided at a vertically intermediate portion coincident with the oil discharge passage 57 at the valve body 50 with an oil discharge bore 60b so that the lubricating oil measured in the measuring chamber 53 at the cylinder bore 51 is adapted to be discharged toward the oil discharge passage 57. Alternatively, at a portion of the outer periphery of sleeve 60 opposite to the oil discharge bore 60b is provided a positioning projection 69 for the oil discharge bore 60b and engageable with the open groove 51a provided at the valve body 50, so that the sleeve 60 is fitted into the cylinder bore 51 while engaging the projection 69 with the open groove 51a, thereby ensuring positioning of oil discharge bore 60b with respect to the oil discharge passage 57. Accordingly, during the assembly, the oil discharge bore 60b can simply and reliably be aligned with the discharge passage 57. At the upper end of open groove 51a provided at the valve body 50, as shown in FIG. 12, is formed a substantially V-like shaped guide 51c, so that the sleeve 60 can easily engage with the open groove 51a.

Figure 9:
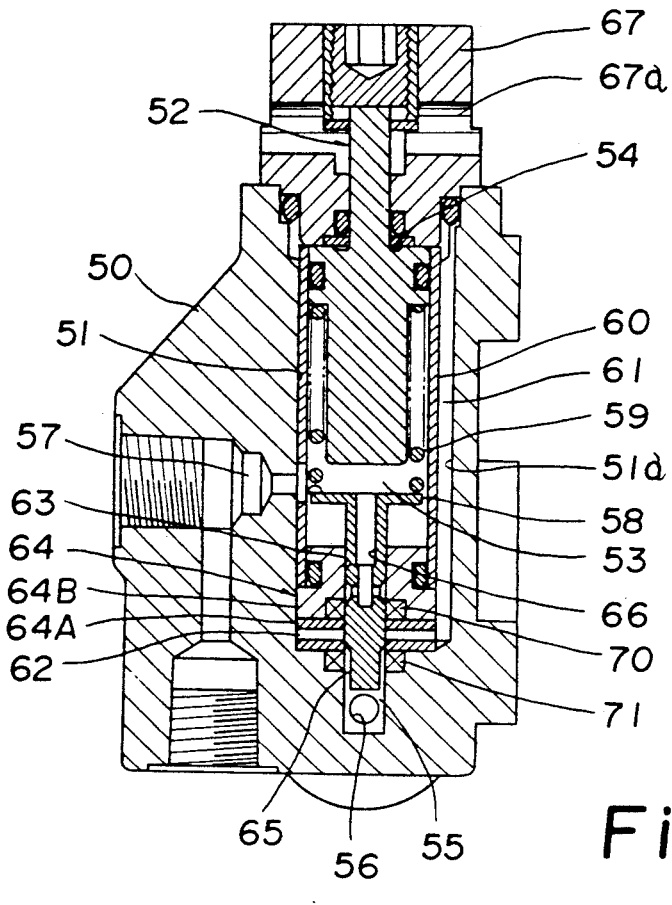
FIG. 9 is a sectional view taken on the line IX—IX in FIG. 8.

Furthermore, the passage block 64 itself may be composed of one member, but, as shown in the embodiments in FIGS. 8 through 10, may be divided into the passage member 64A having the communicating bore 62 and the end member 64B for receiving and supporting the sleeve 60, and may be fitted into the cylinder chamber 51 in the state where the end member 64B and passage member 64A are vertically layered. In this case, the laborious work such that packing 70 for sealing a gap between the insertion bore 63 at the passage block 64 and the valve 58 inserted into the insertion bore 63 is assembled therein at the passage block 64, is saved. The packing 70 can sequentially be assembled together with packing 71 for sealing a gap between the branch 55 of oil feed passage 56 at the valve body 50 and the valve 58 inserted therein and that between the lower surface of passage block 64 and the lower end face of cylinder bore 51. In other words, when the passage member 64A and end member 64B are integral with each other, the laborious work that a packing housing chamber is provided on half way of the insertion bore 63 and the packing 70 is fitted into the housing chamber, is required, but when the passage member 64A and end member 64B are separate from each other, since the packing housing chamber can be formed at the end face of end member 64B, the mounting efficiency of packing 70 is improved to further facilitate the assembly.

In the embodiment shown in the drawing, at a portion of lid 67 is formed a window 67a and an indicator is constructed to confirm through the window 67a the movement of piston 52.

The above-mentioned each distributor 300 is provided at the valve body 50 with the cylinder chamber 51 open at one length end and blind at the other lengthwise end and with the open groove 51a extending of cylinder bore 51, inserts the sleeve 60 into the cylinder bore 51 to form the oil passage 61 communicating with the back chamber 54 of cylinder bore 51, fits into the oil feed passage side of cylinder bore 51 the passage block 64 having the communicating bore 62 communicating with the oil passage 61 and the insertion bore 63 at the valve 58, fixes the sleeve 60 and passage block 64 to the value body 50 by the lid 67 fixed thereto, and is provided at the valve 58 with passages 65 and 66 selectively communicating with one of the oil feed passage 56 and measuring chamber 53 at the cylinder bore 51, whereby the passages are easy to machine and the assembly of parts is easy and the manufacturing cost of the entire apparatus is low. The cylinder borer 51 and sleeve 60 are tapered at the oil feed passage 56 side thereof and toward the passage 56, thereby improving the sealing efficiency between the cylinder bore 51 and the sleeve 60 to reliably prevent the lubricating oil from leaking toward the oil discharge passage 57.

Also, the sleeve 60 is provided with an oil discharge bore 60b coincident with the oil discharge passage 57 at the valve body 50 and with a positioning projection 69 for the oil discharge bore 60b engageable with the open groove 51a, thereby ensuring the positioning of oil discharge bore 60b at the sleeve with respect to the oil discharge passage 57 and further facilitating assembly.

Furthermore, the passage block 64 is composed of the passage member 64A having the communicating bore 62 and of the end member 64B facing the measuring chamber 53 at the cylinder bore 51, so that the packing 70 to be disposed at the insertion bore 63 side of valve body 58 and at the insertion bore 63 side of valve 58 can be saved of from the laborious work of previously assembing the packing 70 within the insertion bore 63. Hence, the packings 70 and 71 can sequentially be assembled with the passage member 64A and end member 64B when assembled in the cylinder bore 51, thereby further facilitating the assembly.

Figure 13:
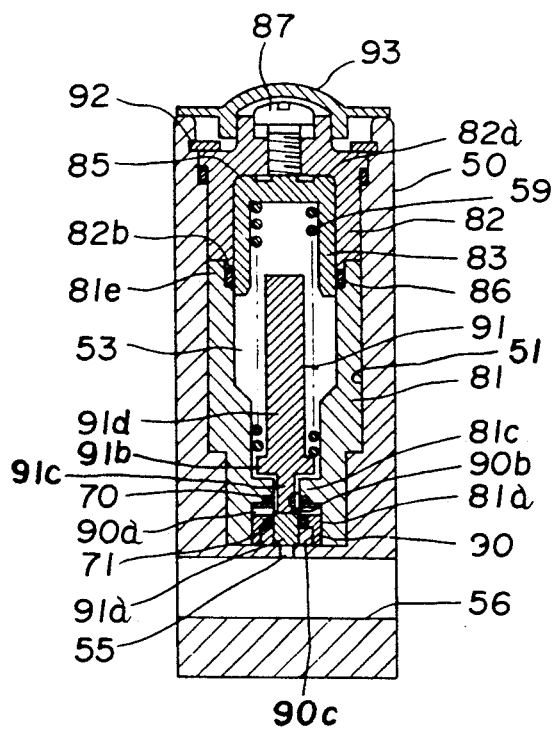
FIG. 13 is a longitudinally sectional view of another modified embodiment of the distributor, corresponding to FIG. 8.
Figure 14:
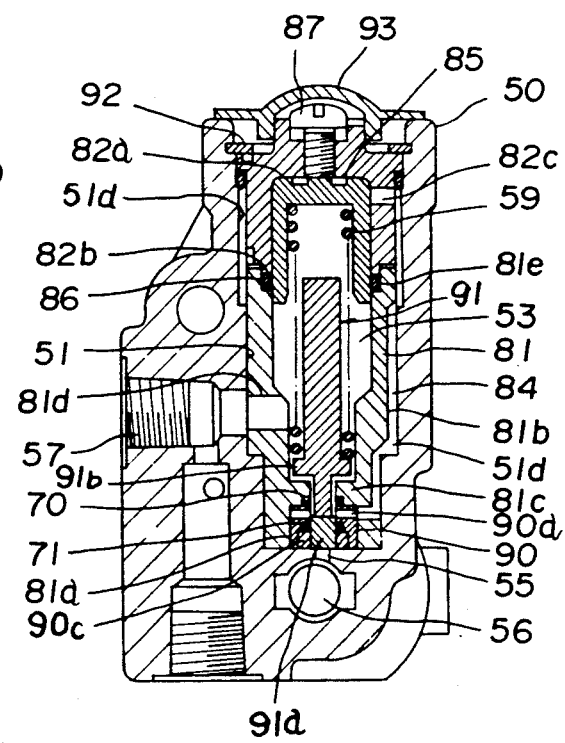
FIG. 14 is a sectional view of still another modified embodiment of the same, corresponding to FIG. 9.

In the above-mentioned embodiment of distributor 300, the sleeve 60 is pipe-like-shaped and fitted into the cylinder bore 51 and the open groove 51a provided at the valve body 50 is closed so as to form the oil passage 61, but alternatively, as shown in FIGS. 13 and 14, the sleeve comprises a first sleeve 81 of synthetic resin mold having a holding portion 81a for holding a passage block 90 and a second sleeve 82 of synthetic resin mold having a restricting portion 82a for restricting the movement of measuring piston 83, the first and second sleeves 81 and 82 being fitted in an abutting manner in the cylinder bore 51, so that, as shown in FIG. 14, the open groove 81b provided at one side outer surface of first sleeve 81 may be closed to form an oil passage 84.

In detail, in the embodiment in FIGS. 13 and 14, the first and second sleeves 81 and 82 form a valve unit member which can previously house the measuring piston 83, a valve 91 to be discussed below and a spring 59. The valve unit member housed therein the above parts to form a valve unit of cartridge type and is adapted to be detachably fitted into the cylinder bore 51, thus the parts can previously be assembled in the valve unit member, whereby the parts can easily be exchanged and the valve 91 can be inspected as to its operation prior to assembly with the valve body 50. Furthermore, since the valve unit member is divided into the first and second sleeves 81 and 82, the measuring piston 83 for coupling the first and second sleeves 81 and 82 can easily be housed in the cylinder bore 51. Also, the embodiment shown in FIGS. 13 and 14, forms an open groove 81b at one side wall of the first sleeve 81 and is provided at the cylinder bore 51 with a larger diameter portion 51d, so that the valve unit member formed of the first and second sleeves 81 and 82 is fitted into the cylinder bore 51, thereby forming the oil passage 84 for communicating the oil feed passage 56 with the back chamber 85 of the measuring piston 83.

The first sleeve 81 provides an inner flange 81c at the opening side to the oil feed passage 56, in other words, at the lower portion of the same in FIGS. 13 and 14, so as to form a holding portion for a passage block 90, and at a lengthwise intermediate portion an oil discharge bore 81d communicating with the oil discharge passage 57 and further at the upper end a shoulder 81e. The second sleeve 82 is provided at the lower end thereof with a shoulder 82b engageable with the shoulder 81e at the first sleeve 81 and the shoulders 81e and 82b interpose therebetween an O-ring 86 so as to engage with each other in an abutting manner. Also, the second sleeve 82 is provided at the upper portion thereof with a lid portion forming the restricting portion 82a and with a communicating bore 82c open at the back chamber 85 and for communicating the back chamber 85 with the oil passage 84, the lid portion having an adjusting screw bolt 87 screwably attached thereto so as to adjust movement of the measuring piston 83 and adjust an amount of lubricating oil discharged from the oil discharge passage 57.

Figure 15:
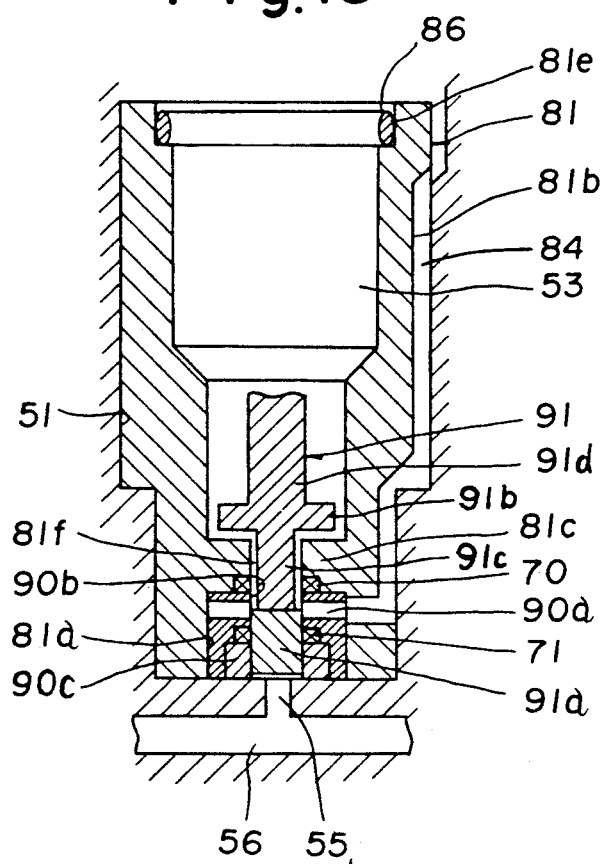
FIG. 15 is an illustration of enlarged first sleeve, passage block and part of the valve used in the embodiments in FIGS. 13 and 14.

The passage block 90 is of construction corresponding to the passage member 64A at the embodiment shown in FIGS. 8 through 10, held to the holding portion 81a at the first sleeve 81 as shown enlarged in FIG. 15, provided with a communicating passage 90a communicating with the oil passage 84, and with an insertion bore 90b into which a valve 91 for communicating or cutting off the communicating passage 90a with respect to the oil feed passage 56 is movably fitted. Also, the passage block 90 is provided at the end thereof with an end member 90c, which is held to the holding portion 81a of the first sleeve 81 and brought into press-contact with the bottom surface of cylinder bore 51 and fixed thereto. In addition, in the above-mentioned embodiments, the passage block 90 is not inevitable, but the communicating passage 90a and insertion bore 90b may be provided directly to the first sleeve 81.

The valve unit member comprising the first and second sleeves 81 and 82, as shown in FIGS. 13 and 14, retains a shoulder provided at the outer periphery of the lid portion of second sleeve 82 a fixture 92 fixed to the opening side of the cylinder bore 51, whereby the first sleeve 81 is urged toward the bottom surface of cylinder bore 51 so as to bring the passage block 90 into press-contact with the bottom surface of cylinder bore 51 to be fixed thereto.

The valve 91 operates the same as the valve 58 in the embodiment shown in FIGS. 8 through 10, which comprises a short column-like-shaped valve 91a, a spring seat member 91b, and an entering portion 91c entering through a gap into the insertion bore 90b at the passage block 90 from an insertion bore 81f provided at the center of the inner flange 81c of the first sleeve 81, and in the embodiment shown in FIGS. 13 and 14, the valve 91a is separate from an upper valve 91d having the spring seat member 91b and entering member 91c.

When the lubricating oil is supplied to the oil feed passage 56, the valve 91a and upper valve 91d both lift so that, when the valve 91d passes the communicating passage 90a at the passage block 90, the communicating passage 90a communicates with the oil feed passage 56 through the branch 55, the oil feed passage 56 communicating with the oil passage 84.

Since the lubricating oil is introduced through the above communication into the back chamber 85 of measuring piston 83, the measuring piston 83 lowers, so that the lubricating oil of a predetermined amount measured by the measuring chamber 53 is discharged from the oil discharge passage 57 and supplied to the predetermined lubricating parts. Also, when depressurized after oil feed is completed, the valve 91a and upper valve 91d both lower by operation of spring 59, when the upper valve 91d returns to the position shown in FIGS. 13 to 15, the oil passage 84 is cut off from the oil feed passage 56 and communicates with the measuring chamber 53 through the communicating passage 90a and a gap between the entering portion 91c and the insertion bores 81f and 90b. Also, the measuring piston 83 lifts by the action of spring 59 so that oil supplied to the back chamber 85 is introduced from the oil passage 84 to the measuring chamber 53 through the communicating passage 90a and the gap, thereby preparing for the next oil supply.

Since the valve 91 is formed as above-mentioned, there is no need that the passage 66 is formed in the valve as shown by the valve 58 in the embodiment shown in FIGS. 8 through 10, thereby facilitating machining. Also, when the valve 91a is divided, the valve 91a is made simply columnar, workability thereof can further be simplified.

In addition, in FIGS. 13 and 14, the components the same as those in FIGS. 8 through 10 are designated by the same reference numerals. Reference numeral 93 designates a cap mounted to the opening side of the cylinder bore 51.

The above-mentioned distribution shown in FIG. 13 through 15 can form the oil passage 84 by inserting the sleeves 81 and 82 into the cylinder bore 51 to form the oil passage 84, thereby facilitating the passage machining. Since the passage block 90 is provided, the communicating bore 90a only is provided at the passage block 90, so as to form a passage communicating with the oil passage 84 from the oil feed passage 56. Thus, the valve body 50 need only be provided with the cylinder bore 51, oil feed passage 56 and oil discharge passage 57, thereby improving its workability.

Figure 16:
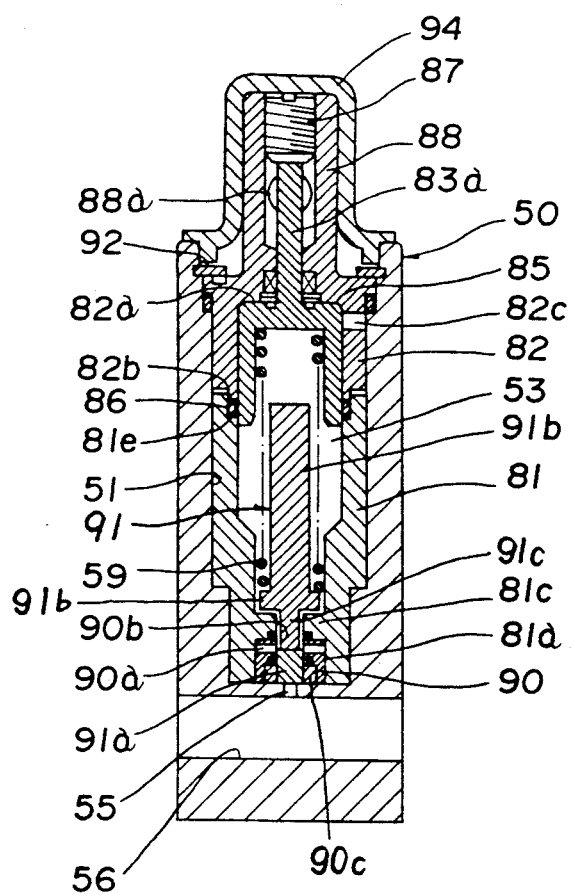
FIG. 16 is a longitudinally sectional view of a further modified embodiment of the distributor.
Figure 17:
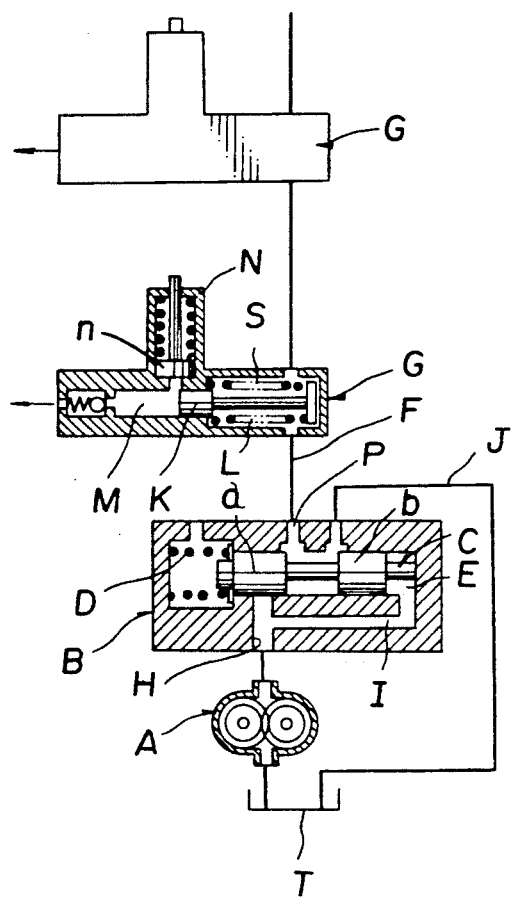
FIG. 17 is an illustration of a conventional example of the lubrication apparatus.
Figure 18:
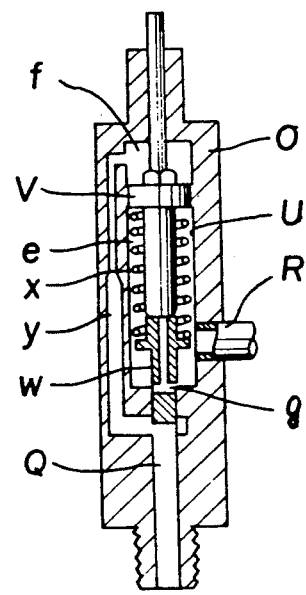
FIG. 18 is a sectional view of an example of conventional distributor.

The distributor shown in FIGS. 13 and 14 may be modified as shown in FIG. 16.

In detail, the distributor shown in FIG. 16 is so constructed that the second sleeve 82 is provided with an extending tubular portion 88 extending from the lid portion, an indicator rod 83a projects from the rear of measuring piston 83 and enters into the extension tubular portion 88, and the indicator rod 83a is checked of its existence through a window 88a provided at the extending tubular portion 88, thereby enabling the operation of measuring piston 83 to be ensured.

Also, in the embodiment in FIG. 16, the adjusting screw bolt 87 screws with the extension tubular portion 88, and a cap 94 is adapted to cover the tubular portion 88.

While a preferred embodiment of the invention has been described, such description is for illustrative purpose only, and it is to be understood that changes and variations may be made without departing from the spirit or scope of the following claims.

What is claimed is:

1. A one-main-pipe type centralized lubrication apparatus comprising:
   a) a pump device having a motor, a pump element operable in association with said motor, a suction passage communicating with the suction side of said pump element, a tank connected to said suction passage, and a discharge passage communicating with the discharge side of said pump element,
   b) one main oil feed pipe, one end of which is connected to said discharge passage of said pump device and the other end of which is closed, and
   c) a plurality of distributors connected to said main oil feed pipe,
   said lubrication apparatus further comprising:
   said pump device being provided with a depressurization passage communicating with said discharge passage and connected to said suction passage, and a depressurization valve for opening or closing said depressurization passage; means for reversing the direction of rotation of said motor from normal rotation to reverse rotation; and an interlocking mechanism provided between said motor and said depressurization valve, for controlling said depressurization valve, during normal rotation of said motor, so as to be positioned in a first position where the depressurization valve closes said depressurization passage and controlling said depressurization valve, during reverse rotation of said motor, so as to be positioned in a second position where the depressurization valve opens said depressurization passage.

2. A one-main-pipe type centralized lubrication apparatus according to claim 1, wherein said interlocking mechanism is provided with an interlocking member in association with normal and reverse rotations of said motor to move in reciprocation between a first position where said depressurization valve is controlled to be closed and a second position where said depressurization valve is controlled to be open, and between said interlocking member and said depressurization valve there is an elastic member which, when said interlocking member is put in the first position, biases said depressurization valve toward the closing direction and, when pressure at said discharge passage exceeds a predetermined pressure, operates to open said depressurization valve.

3. A one-main-pipe type centralized lubrication apparatus according to claim 1, wherein said depressurization passage comprises a first communicating passage communicating with said discharge passage, a second passage communicating with said tank, and a valve chamber in which said communicating passages are open, said depressurization valve comprising a spool for communicating with or cutting off said communicating passages, and said spool being reciprocably housed in said valve chamber, and provided with a position control member for position-controlling into a first position where each of said communicating passages is cut off and a second position where said communicating passages are communicated with each other.

4. A one-main-pipe type centralized lubrication apparatus according to claim 1, wherein said pump device is provided with a discharge pressure detection passage communicating with said discharge passage and an indicator housed in said detection passage and operable in response to a discharge pressure rise.

5. A one-main-pipe type centralized lubrication apparatus according to claim 4 including a sensor for detecting operation of said indicator and a controller for giving a reverse rotation command to said motor on a basis of the detection result of said sensor.

6. A one-main-pipe type centralized lubrication apparatus according to claim 1, provided with a depressurization detecting sensor for detecting depressurization and a motor control circuit which reverses the rotation direction of said motor by on-operation of said sensor and stops the reverse rotation of said motor by off-operation of said sensor.

7. A one-main-pipe type centralized lubrication apparatus according to claim 1, wherein said distributors each is provided with a valve body having a cylinder bore in which an oil feed passage and an oil discharge passage connected to said main oil feed pipe are open, a measuring piston movably housed in said cylinder bore so as to partition said cylinder bore into a measuring chamber and back chamber, a valve for switching said back chamber of said measuring piston to one of said oil feed passage and measuring chamber, and a spring interposed between said valve and said measuring piston so as to bias said valve and measuring piston in the direction of moving away from each other, said distributor further including:
 a) an open groove formed lengthwise of said cylinder bore at said valve body, and open in said cylinder bore;
 b) a sleeve fitted into said cylinder bore, which forms an oil passage for closing said open groove by being fitted into said cylinder bore so as to communicate said oil feed passage with said back chamber;
 c) a passage block fitted into the opening side toward said oil feed passage at said cylinder bore, said passage block having a communicating bore communicating with said oil passage and an insertion bore into which said valve for communicating or cutting off said communicating bore with respect to said oil feed passage is located, and
 d) fixing means for fixing said sleeve and passage block in said cylinder bore.

8. A one-main-pipe type centralized lubrication apparatus according to claim 7, wherein said fixing means comprises a lid fitted into the opening side of said cylinder bore at said valve body so as to press said sleeve to said cylinders bore and a bolt for fixing said lid to said valve body.

9. A one-main-pipe type centralized lubrication apparatus according to claim 7, wherein said sleeve has a shoulder, said fixing means comprising a retainer engageable with said shoulder at said sleeve to be retained to said valve body.

10. A one-main-pipe type centralized lubrication apparatus according to claim 7, wherein said cylinder bore and sleeve fitted into said cylinder bore are tapered in such a manner that both said cylinder bore and sleeve are smaller in diameter from the back chamber side of said measuring piston toward one lengthwise end where said oil feed passage is connected.

11. A one-main-pipe type centralized lubrication apparatus according to claim 7, wherein said oil discharge passage is open at a lengthwise intermediate portion of said cylinder bore into said measuring chamber, said sleeve being provided with an oil discharge bore coincident with said oil discharge passage and a positioning projection engageable with said open groove so as to position said oil discharge bore to said oil discharge passage.

12. A one-main-pipe type centralized lubrication apparatus according to claim 7, wherein said passage block comprises a passage member having said communicating bore and an end member opposite to said measuring chamber, said passage member and end member having insertion bores into which said valve is movably fitted, said end member being provided with a first packing opposite to said insertion bore and in contact with the surface of said passage member, said valve body being provided with a second packing opposite to said oil feed passage and in contact with the rear surface of said passage member.

13. A one-main-pipe type centralized lubrication apparatus according to claim 1, wherein each of said distributors is provided with a valve body having a cylinder bore in which an oil feed passage and an oil discharge passage connected to said main oil feed pipe are open, a measuring piston which is movably housed in said cylinder bore so as to partition said cylinder bore into a measuring chamber and a back chamber, a valve for switching said back chamber of said measuring piston into one of said oil feed passage and measuring chamber, and a spring interposed between said valve and said measuring piston so as to bias said valve and measuring piston in the direction of moving away from each other, said distributor including:
 a) a valve unit member comprising a first sleeve and a second sleeve which are capable of being fitted into said cylinder bore and capable of being coupled in an abutting manner, and being capable of housing said measuring piston, valve and spring;
 b) a valve unit housing in said valve unit member said measuring piston, valve and spring and detachably fitted into said cylinder bore;
 c) an open groove formed at one of said valve unit member and valve body and extending lengthwise of said cylinder bore, so as to form an oil passage for communicating said oil feed passage with said back chamber by fitting said valve unit into said cylinder bore; and d) fixing means for detachably fixing said valve unit member in said cylinder bore; said first sleeve being provided with a communicating passage for selectively communicating by operation of said valve said oil passage with one of said oil feed passage and measuring chamber, said second sleeve being provided with a regulating portion for regulating movement of said measuring piston and a communicating bore for communicating said oil passage with said back chamber, and said valve unit member being provided with an oil discharge bore for communicating said measuring chamber with said oil discharge passage.

14. A one-main-pipe type centralized lubrication apparatus according to claim 13, wherein said first sleeve has an insertion bore into which said valve is movably fitted, said valve being provided with a spring seat, an entering portion entering with a gap into said insertion bore, and a valve portion provided at a distal end of said entering portion and fitted into said insertion bore in a close contacting manner, and said communicating passage communicating with said oil passage which is open in said insertion bore.

15. A one-main-pipe type centralized lubrication apparatus according to claim 14, wherein said valve portion at said valve is divided with respect to said entering portion.

* * * * *